Figure 1:
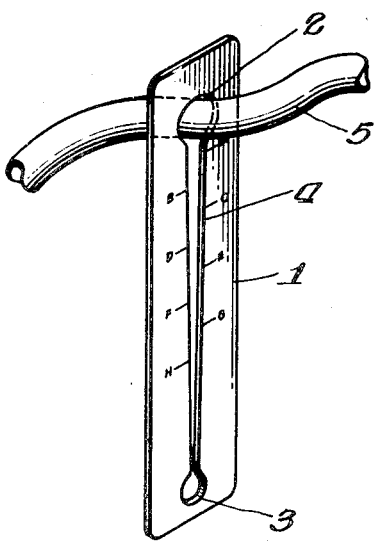

April 11, 1950     M. R. FIELDS     2,503,327

PINCHCOCK

Filed May 7, 1947

Inventor:
Mack R. Fields
By: Soans, Pond & Anderson
Attorneys

Patented Apr. 11, 1950

2,503,327

UNITED STATES PATENT OFFICE 2,503,327

PINCHCOCK

Mack R. Fields, Chicago, Ill., assignor to Abbott Laboratories, North Chicago, Ill., a corporation of Illinois Application May 7, 1947, Serial No. 746,494

1 Claim. (Cl. 251—5)

This invention relates to a so-called pinchcock, that is to say to a device for pinching or collapsing flexible tubing to close or partially close the same for controlling the flow of liquid or fluid through the tubing. The device as herein contemplated is useful particularly in hospitals and similar places for controlling the flow of liquids through rubber or other tubing used in connection with the intravenous administration of liquids, and in chemical and other laboratories where relatively small-sized tubing is employed for conducting fluids or liquids.

The main objects of the invention are to provide a very simple and inexpensive, but nevertheless very effective pinch-cock, and to provide such a device which is very easy to apply and use.

Other objects and advantages of the invention will be understood by reference to the following specification and accompanying drawing in which there is illustrated a pinch-cock embodying a selected form of the invention.

Figure 2:
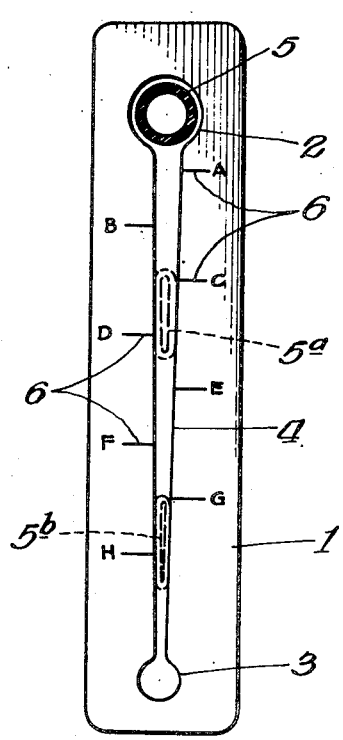

In the drawings:

Fig. 1 is a perspective view illustrating a selected form of the improved pinch-cock in inoperative position on a length of resilient tubing such as rubber or thermoplastic tubing, and Fig. 2 is a plan view.

The pinch-cock illustrated in the drawing comprises a thin metal plate, preferably of stainless steel or other non-corrodible metal. One practical embodiment designed for use in connection with resilient thermoplastic tubing having an internal diameter of about $7/64$ of an inch, and a wall thickness of about .020 inch, is made of metal having a thickness of about .025 inch, the plate being about $3/8$ of an inch wide and $1 3/4$ inches long. Such a plate is represented at 1, and it is provided with circular openings 2 and 3 near its ends, and a tapering slot 4 extending between and communicating with said openings 2 and 3. The opening 2 is approximately $3/16$ of an inch in diameter so as to freely movably receive the tubing which is represented at 5. The other opening 3 may be much smaller, and is provided mainly to facilitate removal of the wedge-shaped piece to form the tapering slot or opening 4, and to avoid the requirement of a very thin and, hence, weak punch and die structure which would otherwise be necessary to punch-out the slot 4. The slot 4 tapers from a width of about $1/16$ of an inch at its juncture with the opening 2 to a width which is small enough to insure complete collapsing of a tube of the character mentioned when positioned between the slot-formed edges of the device adjacent the end opening 3.

The width of the wide end of the slot 4 may, of course, be made to correspond to the required size of the opening 2 but it is preferable that there be a substantial reduction in this dimension as compared with the terminal opening 2 so that positive collapsing of the tube will be required to effect its insertion into the slot 4. This will prevent accidental movement of the device into tube-pinching position. This is desirable especially in connection with the use of certain types of thermoplastic tubing which tend to take a set when held in a squeezed position for an extended period of time. Hence, such tubing is protected against accidental pinching by the device.

The dimensions referred to are, of course, merely typical; the same represent one practical embodiment of the device suited to the control of liquid flow through tubing of the size indicated in connection with the intravenous administration of liquids. Other opening sizes and proportions may be substituted to suit other specific applications of the device. However, it will also be apparent that an almost universal device may be made, if desired, by making the opening 5 large enough and the slot of such width and length as to accommodate the desired range of flexible tubing sizes.

The device is used as indicated in Fig. 2, namely, by initially threading the tubing 5 through the large end opening 2. When the device is at the desired location on the length of the tubing, it is moved transversely of the tubing to thereby effect collapsing of the tubing as indicated in dotted lines at 5a and 5b, the latter position showing a more completely collapsed position of the tubing whereby the liquid carrying capacity of the tubing is more highly restricted than in the intermediate position represented at 5a. By moving the tubing nearer to the end opening 3, the walls of the tubing may be completely collapsed so as to completely close the passageway to prevent all flow of liquid.

As already indicated, the described pinch-cock is especially adapted for use as an element of medical and surgical equipment, i. e., for controlling the flow of liquids in tubing used in connection with intravenous administration of liquids. Such liquids are administered, not in a continuous stream but drop-by-drop and the drop-by-drop flow is usually measured in drops per minute. The rate varies between said limits depending upon various considerations in each case and may be said to ordinarily fall within the range of around 60 to 300 drops per minute. By reason of the very gradually tapering slots in the described structure, the flow rate can be effectively varied by very small increments, for example, by increments of 5 or 10 drops or even less, so that the directions of a physician may readily be complied with within very close limits.

For some purposes it may be desirable to provide on the pinch-cock a register or index to indicate certain positions, and this may conveniently be done by means of index marks such as represented at 6 which may be engraved on either or both faces of the plate with appropriate references such as the letters A, B, C, etc.

The thin metal plate structure described is very light in weight, and being flat adds no material bulk to equipment with which it is used. The resiliency of the tubing is adequate to cause frictional retention of the pinch-cock in any selected position of adjustment. Instead of making the device of metal, plastic and fibrous materials may be substituted so long as the materials selected provide the desired rigidity to prevent separation of the plate sections on opposite sides of the elongated slot incident to the expansive force of the tubing when collapsed in the tapered slot. Metal structures such as described may be very economically made by punching the same out of a strip of suitable metal and then tumbling a quantity of the devices in a batch of suitable abrasive to remove sharp edges which are normally produced by metal punching and shearing operations. The provision of a register such as above referred to is by no means necessary, but it may be easily applied by a simple stamping, printing or engraving operation, if desired. For most purposes the register is not needed since the rate of flow will normally be checked by actual measurement or count and appropriate adjustment made until the desired rate of flow is obtained.

The described pinch-cock accomplishes all the functions of the more complicated and expensive screw and spring wire pinch-cocks, and it is much simpler and easier to apply and adjust. Furthermore, once it is applied to a length of tubing, its loss is practically impossible since it cannot be removed without positively withdrawing the length of tubing from the slot or opening of the device.

Changes in the described structure may, of course, be made while retaining the principles of the invention.

I claim:

In the combination with a flexible tubing for conducting liquids in medical and surgical equipment in which flow rates are normally in the range of about 60 to 300 drops per minute, a pinch-cock for adjusting the rate of flow therethrough comprising a plate member having an opening therein and a tapered slot communicating at its wider end with said opening, said opening being of such size as to be adapted to freely slidably receive the tubing to thereby permit free movement of the member along the length of such tubing, said slot having a wide end portion of a width which is substantially less than the normal outside width of the tubing so as to require substantial transverse compression of the tubing to permit the same to be moved into said slot, whereby accidental entrance of such tubing into said slot is resisted, and whereby, when the tubing is pinched in said slot, the expansive pressure of the tubing on the walls of said slot will cause the pinch-cock to be held in selected position both lengthwise and transversely of the tubing, the taper of said slot being so gradual that said expansive pressure produces no significant tendency to effect movement of the pinch-cock in the direction of the length of said slot, thereby insuring stability of the pinch-cock in all positions of adjustment transversely of the tubing and whereby adjustment in increments of a selected number of drops per minute of the rate of flow through said tubing is facilitated, and the thickness of said plate member being such that only a line-like portion of the length of said tubing is pinched between said slot walls, whereby resistance to adjustment of the member transversely of the tubing is maintained at a minimum to thereby facilitate such adjustment.

MACK R. FIELDS.

REFERENCES CITED

The following references are of record in the file of this patent:

UNITED STATES PATENTS

| Number | Name | Date |
| --- | --- | --- |
| 887,558 | Werner | May 12, 1908 |

FOREIGN PATENTS

| Number | Country | Date |
| --- | --- | --- |
| 87,013 | Germany | of 1896 |
| 644,234 | Germany | of 1937 |